United States Patent
Ly et al.

(10) Patent No.: US 10,058,942 B2
(45) Date of Patent: Aug. 28, 2018

(54) ABRASIVE SAWING WIRE, PRODUCTION METHOD THEREOF AND USE OF SAME

(71) Applicants: COMMISSARIAT A L'ENERGIE ATOMIQUE ET AUX ENERGIES ALTERNATIVES, Paris (FR); Thermocompact, Metz-Tessy (FR)

(72) Inventors: Michel Ly, Annecy (FR); Gérald Sanchez, Dingy Saint Clair (FR); Xavier Weber, Annecy (FR)

(73) Assignees: Commissariate a l'Energie Atomique et aux Energies Alternatives (FR); Thermocompact (FR)

( * ) Notice: Subject to any disclaimer, the term of this patent is extended or adjusted under 35 U.S.C. 154(b) by 305 days.

(21) Appl. No.: 14/787,205

(22) PCT Filed: Apr. 15, 2014

(86) PCT No.: PCT/FR2014/050910
§ 371 (c)(1),
(2) Date: Oct. 26, 2015

(87) PCT Pub. No.: WO2014/184456
PCT Pub. Date: Nov. 20, 2014

(65) Prior Publication Data
US 2016/0082533 A1 Mar. 24, 2016

(30) Foreign Application Priority Data
May 14, 2013 (FR) ...................................... 13 54311

(51) Int. Cl.
B26D 1/547 (2006.01)
B28D 1/08 (2006.01)
(Continued)

(52) U.S. Cl.
CPC ........... *B23D 61/185* (2013.01); *B23D 65/00* (2013.01); *B24D 3/06* (2013.01); *B24D 18/0018* (2013.01);
(Continued)

(58) Field of Classification Search
CPC ....... B24D 3/342; B24D 3/06; B24D 18/0018
See application file for complete search history.

(56) References Cited

U.S. PATENT DOCUMENTS 2,710,832 A * 6/1955 Harr ........................ C25D 3/20
204/238
4,050,996 A * 9/1977 Klingenmaier .......... C25D 5/36
205/129
(Continued)

FOREIGN PATENT DOCUMENTS

EP 2277660 A1 1/2011
EP 2428317 A2 3/2012
(Continued)

*Primary Examiner* — Joseph J Hail
*Assistant Examiner* — Jon Taylor
(74) *Attorney, Agent, or Firm* — Forge IP, PLLC

(57) ABSTRACT

An abrasive wire including a steel core and a coating including a binder and abrasive particles, the binder being formed by at least one iron alloy layer containing, by weight percent in relation to the weight of the binder: between 0 and 3% oxygen, advantageously between 0 and 2%; and between 0.3% and 9% of at least one element selected from the group including carbon, boron an phosphorous.

13 Claims, 1 Drawing Sheet

(51) Int. Cl.
*B23D 61/18* (2006.01)
*B24D 18/00* (2006.01)
*B23D 65/00* (2006.01)
*B24D 3/06* (2006.01)
*B28D 5/04* (2006.01)
*C25D 3/20* (2006.01)
*C25D 3/56* (2006.01)
*C25D 7/06* (2006.01)

(52) U.S. Cl.
CPC ............... *B28D 5/045* (2013.01); *C25D 3/20* (2013.01); *C25D 3/562* (2013.01); *C25D 7/0607* (2013.01)

(56) References Cited

U.S. PATENT DOCUMENTS

| | | | |
|---|---|---|---|
| 2011/0034113 A1* | 2/2011 | Kazahaya | B23D 61/185 451/296 |
| 2012/0017741 A1* | 1/2012 | Lange | B23D 61/185 83/651.1 |
| 2012/0167482 A1 | 7/2012 | Tian et al. | |
| 2014/0150766 A1* | 6/2014 | Che | B24B 27/0633 125/16.02 |

FOREIGN PATENT DOCUMENTS

| | | | |
|---|---|---|---|
| WO | WO 2010092151 A1 * | 8/2010 | ........... B23D 61/185 |
| WO | 2010125085 A1 | 11/2010 | |

* cited by examiner

ABRASIVE SAWING WIRE, PRODUCTION METHOD THEREOF AND USE OF SAME

FIELD OF THE INVENTION

The invention relates to an abrasive wire comprising a steel core and abrasive particles maintained on the core by a binder based on iron.

The field of use of the present invention particularly concerns the sawing of materials such as silicon, sapphire, or silicon carbide.

BACKGROUND OF THE INVENTION

Generally, the cutting of hard materials such as silicon wafers may be performed by means of a steel wire having abrasive particles (for example, made of diamond) at its periphery.

To solve possible wire breaks, prior art advocates the use of a steel wire having a high carbon content.

Abrasive particles are bonded to the wire by means of a resin or metal binder layer. Such a binder maintains the particles at the surface of the wire to give abrasive properties thereto.

Generally, and conversely to the binder, the particles are made of a material harder than the material to be cut.

Indeed, at the first use of the wire, the binder is partly eroded to expose the abrasive particles. The sawing of the material is then performed by repeated passages of the cutting wire on the surface of the material to be cut, that is, by friction of the protruding portions of the abrasive particles on the material.

Once the protruding portions of the abrasive particles have been exposed, the binder no longer comes in direct contact with the material to be cut. However, it may wear according to the two following mechanisms:

- by mechanical deformation: on sawing of a material, the abrasive particles are alternately pushed forward and backward and along the main direction of the wire. This motion is the direct consequence of the friction with the material being cut. Thus, the binder deforms a little for each movement. At the end of the cutting, the binder may be locally too deformed to efficiently retain the abrasive particles at the surface of the wire.
- by abrasion/erosion: this mechanism results from the presence of fragments of the material to be cut located between the binder—which displaces along with the wire—and the material to be cut. Due to the sawing movements, the fragments of material erode the binder, with, as a consequence, a progressive decrease of its thickness. At the end of the cutting, the binder is no longer thick enough to efficiently retain the abrasive particles at the surface of the wire. The abrasive particles detach, which progressively decreases the abrasive power of the wire and thus its ability to cut a material.

Generally, mechanical deformation is a stronger phenomenon than the abrasion of the binder.

To delay or even to suppress the deterioration of the abrasive properties of the wire, binders based on metal alloys have been developed. They appear to have better hardness properties than a resin.

Thus, to limit the wearing of the wire, a binder based on a nickel and phosphorus alloy may be used. The binder is chemically deposited at the wire surface to cover abrasive grains. Further, its hardness is greater than that of pure nickel.

To limit the cracking of the bonding layer, document EP 2 428 317 advocates limiting the sulfur, oxygen, and hydrogen contents in the electrolytic nickel deposit.

Other solutions comprise using a binder made of cobalt/nickel alloy. Now, the electrodeposition of this type of nickel/cobalt involves compounds such as nickel sulfate, which is carcinogen. Further, metal nickel may cause allergies.

Metal binders may generally corrode in contact with water which is brought into the cutting area. Since this phenomenon of course adversely affects the lifetime of the abrasive wire, the corrosion of the binding metal is desired to be avoided by those skilled in the art.

The wire and the binder should thus meet certain requirements.

Preferably, the binder should not crack during the wire use. When the wire is stretched, at its maximum stress limit, the surface of the binder should not crack.

There thus is a need to develop alternatives to such binders, especially to ensure the maintaining of the abrasive grains on the core of an abrasive wire, but also to control the wearing and the degradation of the binder. The present invention aims at solving this technical problem.

SUMMARY OF THE INVENTION

The Applicants have developed a wire having the abrasive particles maintained by means of an iron-based binder at its surface.

The wire according to the invention comprises an iron-based binder, which enables, in particular, to avoid possible cancer and allergy problems due to binders comprising a high nickel content, on manufacturing or use thereof.

More specifically, the object of the present invention relates to an abrasive wire comprising a steel core and an external composite coating comprising a binder and abrasive particles, said binder being formed of at least one iron alloy layer containing, by mass with respect to the binder mass:
- from 0 to 3% of oxygen, advantageously from 0 to 2%; and
- from 0.3 to 9% of at least one element selected from the group comprising carbon, boron, and phosphorus.

As already indicated, the binder enables to maintain the abrasive particles at the periphery of the steel core. Thus, the abrasive particles essentially have no degree of liberty on said core. Advantageously, the particles have no degree of liberty on the steel core, particularly on use of the abrasive wire according to the invention.

Indeed, the iron alloy binder provides a better hold of the particles on the core than prior art resin binders. It has properties of hardness and resistance to abrasion enabling to more efficiently maintain the particles in place, even on use of the wire during cutting operations.

The abrasive particles may be in direct contact with the steel core, but they may also advantageously be separated from the core by a thin binder layer. This is particularly true when the method shown in FIG. 1 is implemented.

The binder at least partially covers the abrasive particles.

According to a specific embodiment, the external composite coating comprises at least one additional iron alloy binder according to the invention. The binder should thus appear in the form of a single layer or of a plurality of layers, advantageously two layers.

The binder layers may be made of iron alloys different from one another.

"Layer" means a sheath of the wire, of homogeneous composition. Thus, two layers can be distinguished from each other by the difference between their chemical compositions, or by the presence of abrasive in one of them only.

The first binder layer, in contact with the steel core, may have a hardness greater than that of the additional layers to maintain the abrasive particles on the wire.

However, the additional binder layer(s) (external layer(s)) are advantageously highly resistant to corrosion and to cracking. Advantageously, they are not brittle and have better ductility properties than the lower layers.

Thus, according to a specific embodiment, the abrasive wire comprises a steel core and an external composite coating comprising a binder and abrasive particles. The binder is, in this specific case, formed of two iron alloy binder layers according to the invention. The second binder layer which covers the first binder layer adjacent to the steel core is made of an iron alloy having better abrasion and/or corrosion resistance properties.

Generally, the hardness of the iron alloy binder may be improved by introduction of carbon and/or of phosphorus.

Boron enables to limit the quantity of oxygen comprised in the alloy. Indeed, the Applicants have discovered that the presence of more than 3% by mass of oxygen in an iron-based alloy embrittles it. The addition of boron and/or of phosphorus enables to limit the oxygen capable of being incorporated into the iron-based alloy on electrodeposition thereof.

The addition of phosphorus enables to improve the corrosion resistance properties.

Thus, according to a specific embodiment, the iron alloy may contain from 0.5 to 1.5% by mass of carbon, preferably 1%.

According to another specific embodiment, the iron alloy comprises from 0.3 to 1% by mass of boron, preferably 0.5%

According to another specific embodiment, the iron alloy comprises from 1 to 9% by mass of phosphorus, preferably 4%

The binder, be it monolayer or multilayer, may in particular be obtained by successive electrodepositions of iron alloys.

According to another specific embodiment, the iron alloy may comprise at least 97% by mass of iron, and less than 1% by mass of nickel and/or less than 1% by mass of cobalt. Indeed, the addition of nickel or cobalt in the electrodeposited iron may pose technical problems of stabilization of their concentrations.

As already mentioned, the iron alloy according to the invention comprises from 0.3 to 9% of at least one element selected from the group comprising carbon, boron, and phosphorus. When it comprises a plurality of these elements, the total carbon, boron, and phosphorus content is advantageously in the range from 0.3 to 9%.

The alloy forming each of the binding layers advantageously has a hardness, expressed in Vickers (Hv) in the range from 300 to 900 Hv, advantageously 600 Hv.

The hardness of a binding metal layer is measured by means of a micro-hardness tester according to techniques within the knowledge of those skilled in the art. A Vickers indenter is generally used, with a load compatible with the layer thickness. Such a load is generally in the range from 1 gram-force to 100 grams-force. If the mark left by the Vickers indenter is too large with respect to the layer thickness (even with a small load), a Knoop indenter (narrower) may be used, and the Knoop hardness value may be converted into Vickers hardness, by means of a conversion table.

The abrasive particles enabling to cut materials may in particular be made of a material selected from the group comprising silicon carbide SiC; silica $SiO_2$; tungsten carbide WC; silicon nitride $Si_3N_4$; boron nitride BN; chromium dioxide $CrO_2$; aluminum oxide $Al_2O_3$; diamond; and pre-metallized diamonds (for example, with nickel, cobalt, copper, iron, or titanium).

According to a specific embodiment, the abrasive wire may comprise several different types of abrasive particles.

It will be within the abilities of those skilled the art to select the adequate binder/abrasive particle combination according to the material to be cut.

According to a specific embodiment, the abrasive particles are formed of grains covered with a film, which is different from the binder. The film at least partially covers each grain, advantageously integrally.

The total diameter of the particles, that is, of the grain, and possibly of the film, is advantageously in the range from 1 micrometer to 500 micrometers. It is preferably smaller than one third of the diameter of the steel core. Thus, according to a specific embodiment, the particle diameter may be in the range from 12 to 22 for a core having a 0.12-mm diameter.

Diameter means the largest diameter (or the largest dimension) that they have when they are not spherical.

Advantageously, the film covering the grain is made of a metallic material, possibly ferromagnetic. Further, the material forming the film is advantageously electrically conductive.

It may in particular be a film of a material selected from the group comprising iron, cobalt, nickel, copper, and titanium.

The film at least partially covers the abrasive particles, advantageously integrally. However, during the use of the abrasive wire according to the invention, the grain portion in contact with the material to be cut comprises no film, the latter being eroded from as soon as the first cutting operations, in the same way as the binder.

The mass of the film, relative to the total mass of the coated grains, is advantageously in the range from 10% to 60%, particularly in the case of diamond grains.

The film may in particular be deposited on the grains prior to the use of the abrasive grains/particles in the film manufacturing method. Techniques which may be implemented for the deposition of a film on each of the grains especially include cathode sputtering, but also electrolysis, chemical vapor deposition (CVD), and electroless nickel plating.

It can generally be observed that from 5 to 50% of the surface area of the abrasive wire is occupied by abrasive particles (possibly covered with a binder layer, when the wire is new).

Generally, the steel core of the abrasive wire according to the invention is a wire having a circular transverse cross-section. It is a steel wire having a diameter advantageously in the range from 70 micrometers to 1 millimeter.

It will be within the abilities of those skilled in the art to adapt the core diameter according to the material to be cut. Thus, a core having a diameter in the range from 200 micrometers to 1 millimeter is particularly adapted to cut silicon bricks in ingots. However, a core having a diameter in the range from 70 to 200 micrometers is particularly adapted to cut silicon wafers in bricks.

The core of the abrasive wire generally appears in the form of a wire having a resistance to traction advantageously greater than 2,000 or 3,000 MPa, but, generally, smaller than 5,000 MPa.

On the other hand, the core may have an elongation at break, that is, the increase of the length of the core before it breaks, advantageously greater than 1%, more advantageously still greater than 2%. However, it remains preferably smaller than 10 or 5%.

Advantageously, the wire core is made of an electrically-conductive material, that is, a material having a resistivity lower than $10^{-5}$ ohm·m at 20° C., and particularly steel.

The steel core may in particular be made of a material selected from the group comprising carbon steel, ferritic stainless steel, austenitic stainless steel, and brass-plated steel. Carbon steel preferably contains from 0.6 to 0.8% by mass of this element.

The present invention also relates to a method of manufacturing the above-described abrasive wire. The method especially comprises the steps of:
- electrodeposition on a steel wire of a composite coating comprising a binder and abrasive particles, possibly coated with a metal film by passing in an electrolyte bath ($B_1$) comprising at least iron II ions, abrasive particles, and at least one source of at least one element selected from the group comprising carbon, boron, and phosphorus;
- optionally, electrodeposition of an additional layer of iron alloy binder by passing in an electrolyte bath ($B_2$) comprising at least iron II ions, and at least one source of at least one element selected from the group comprising carbon, boron, and phosphorus.

The involved abrasive particles may be magnetic.

Although Fe III ions may be present in the bath, it is preferable to limit their concentration, particularly by limiting the contact of the bath with oxidizing elements, such as atmospheric oxygen. For this purpose, it will be avoided to inject compressed air to stir the bath.

Advantageously, the method may comprise at least one of the following steps, before the electrodeposition:
- degreasing the steel core in an alkaline medium;
- pickling the steel core in an acid medium.

When this method comprises a second electrodeposition of iron alloy, bath ($B_2$) may have a composition different from that of bath ($B_1$). This bath advantageously comprises no abrasive particles.

Bath $B_1$ advantageously produces a binder layer of high hardness while bath $B_2$ advantageously produces a layer of ductile binder, that is, of low brittleness, and with a good corrosion resistance.

As already indicated, the binder may comprise at least two layers. The possible layer(s) covering the second layer may be obtained either by repeating the passing in the second bath ($B_2$), or by passing in at least another electrolytic bath comprising Fe II ions.

Typically, baths ($B_1$) and ($B_2$), and, possibly, the other baths, comprise, independently from one another, from 20 to 100 g/L of Fe II ions.

On the other hand, bath ($B_1$) comprises abrasive particles, advantageously from 1 to 100 g/L.

As already mentioned, the iron alloy forming the binder contains at least one element selected from the group comprising carbon, boron, and phosphorus.

Thus, carbon may in particular be introduced by addition of at least one carbon source in the electrolyte bath enabling to form the binder. This carbon source may be selected from the group comprising citric acid, L ascorbic acid, succinic acid, dicarboxylic acids with a linear chain, and mixtures thereof. For example, 1.2 g/l of citric acid and 3 g/l of ascorbic acid in the bath.

Boron may in particular be introduced by addition of at least one boron source in the electrolyte bath enabling to form the binder. This boron source may be selected from the group comprising boric acid, borane dimethylamine, and mixtures thereof. For example, 40 g/l of boric acid and 1.8 g/l of borane dimethylamine may be used in the bath.

Phosphorus may in particular be introduced by addition of at least one phosphorus source in the electrolyte bath enabling to form the binder. This phosphorus source may be selected from the group comprising sodium hypophosphite, hypophosphorous acid, and mixtures thereof. For example, from 1 to 20 g/l of sodium hypophosphite may be used.

Cobalt and nickel may be introduced by addition of Co II and/or Ni II ions in the electrolyte bath. However, it may be difficult to stabilize the nickel and/or cobalt concentrations in the electrodeposited binder.

For further details relative to the method steps as well as to the device used, reference should in particular be made to the patent application filed under number FR 12 53017.

The invention also relates to the use of the above-described abrasive wire, to saw a material capable of being selected, in particular, from the group comprising silicon, sapphire, and silicon carbide. The abrasive wire may be used in the context of silicon wafer manufacturing.

It will be within the abilities of those skilled in the art to adapt the abrasive wire according to the material to be cut. More particularly, the abrasive particles are selected to be harder than the material to be cut.

The invention and the resulting advantages will better appear from the following non-limiting drawings and examples, provided as an illustration of the invention.

DETAILED DESCRIPTION OF THE INVENTION

Figure 1:
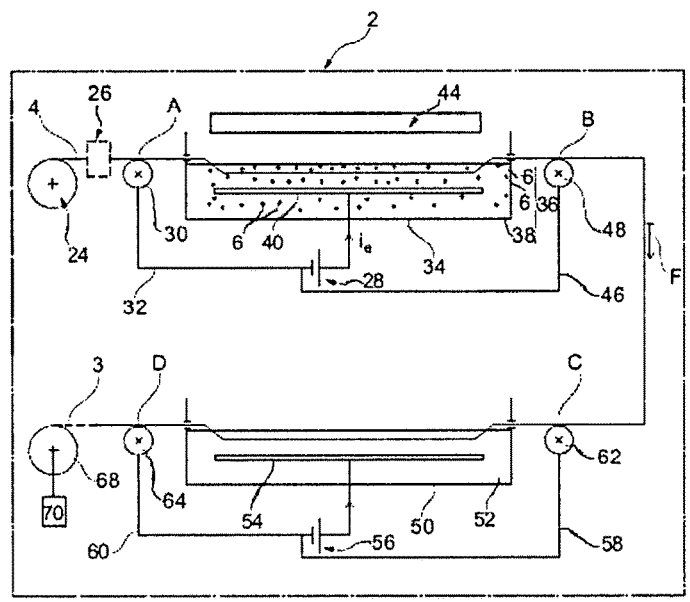
FIG. 1 illustrates a device enabling to obtain the abrasive wire according to a specific embodiment of the invention.

Device (2) illustrated in FIG. 1 enables to implement a method of electrodeposition on a steel wire (4) to prepare the abrasive wire (3) according to a specific embodiment of the present invention.

The method especially comprises the steps of:
- unwinding a steel wire (core) (4) stored in the form of a coil (24), along the direction of arrow F;
- optionally, degreasing the steel core (4) in an alkaline medium;
- optionally, pickling the steel core (4) in an acid medium;
- optionally, passing steel core (4) through a magnetization device (26) which applies a magnetic field, having an intensity advantageously greater than 800 A/m. Core (4) is thus permanently magnetized:
- electrodepositing on a steel core a composite coating comprising a binder and abrasive particles, by passing in a bath ($B_1$) (36) of electrolyte (38) comprising at least iron II ions, and abrasive particles (6), and at least one source of at least one element selected from the group comprising carbon, boron, and phosphorus;
- optionally, electrodepositing a second binding layer by passing in a bath ($B_2$) of electrolyte (52) comprising at least iron II ions, and at least one source of at least one element selected from the group comprising carbon, boron, and phosphorus;
- obtaining the abrasive wire (3);
- optionally storing the abrasive wire (6), advantageously in the form of a coil (68) by means of a motor (70).

The device (2) used comprises a source (28) which generates an electrolysis current $i_e$. The positive terminal of the source (28) is connected to electrode (40) located in bath ($B_1$) (36) of electrolyte (38) which is contained in vessel (34). The electrode (40) is advantageously made of pure iron. The negative terminal of source (28) is connected to two conductive pulleys (30) and (48) arranged on either side of vessel (34) via electric conductors (32) and (46). The two conductive pulleys (30) and (48) enable to provide two points (A) and (B) of mechanical contact with steel core (4)n which is thus connected to the negative terminal of source (28).

Device (2) optionally comprises a device (44) for magnetizing abrasive particles (6) and steel core (4) once it is immersed in bath ($B_1$) (36). It is positioned above bath ($B_1$) (36).

The abrasive particles used may be magnetic to allow a fast electrodeposition of the external composite coating on the steel core. They can thus be attracted by the steel core, which is magnetized during this process.

As already mentioned, the magnetic properties of the abrasive particles may in particular originate form a magnetic film covering them.

The steel core is thus covered with a coating made of binder and of abrasive particles by electrodeposition on passing in the bath ($B_1$).

According to a specific embodiment, a second binder layer may then be deposited on the steel core, by passing in second bath ($B_2$) (52).

Second bath ($B_2$) (52), which is contain in vessel (50), comprises an electrolyte. It advantageously comprises no abrasive particles.

The step of electrodeposition of the second binder layer comprises, in particular, immersing the steel core covered with a first binder layer and with abrasive particles, in a bath having an electrode (54) connected to the positive terminal of a second current source (56) arranged therein. Electrode (54) is advantageously made of pure iron.

The negative terminal of second current source (56) is connected to two conductive pulleys (62) and (64) arranged on either side of vessel (50) containing second bath ($B_2$) (52) via electric conductors (58) and (60).

Conductive pulleys (62) and (64) provide the connection between steel core (4) and the negative terminal of second current source (56) at contact points (C) and (D).

After the passing through the second electrolyte bath, abrasive wire (3) is obtained. It may be stored in the form of a coil (68).

As already indicated, the device (2), and its implementation according to a specific embodiment are described in further detail in the patent application filed under number FR12 53017.

Figure 2:
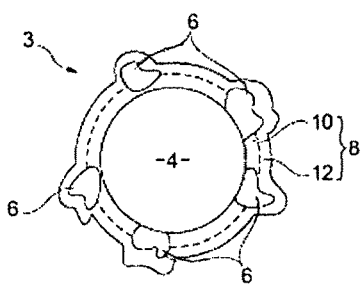
FIG. 2 illustrates a cross-section view of the abrasive wire according to a specific embodiment of the invention.

As shown in FIG. 2, abrasive wire (3) according to the invention has a core (4) coated with a first binder layer (10) partially covering abrasive particles (6).

According to this specific embodiment, the abrasive wire further comprises a second binder layer (12) covering abrasive particles (6). This second binder layer is advantageously more resistant to cracking (that is, less brittle) and more resistant to corrosion, than the first layer. It may be softer than the first layer (10) covering the steel core (4).

The two layers (10) and (12) and abrasive particles (6) form external composite coating (8) of abrasive wire (3).

Figure 3:
FIG. 3 illustrates a cross-section view of an abrasive particle of the abrasive wire according to a specific embodiment of the invention.

According to a specific embodiment, abrasive particle (6) comprises an abrasive grain (16) covered with a film (18) (FIG. 3). The film is advantageously made of a metallic material, possibly ferromagnetic, to ease the electrodeposition of the particles on steel core (4). Indeed, the electrodeposition of the external composite coating is advantageously implemented in the presence of particles covered with a metal film, possibly ferromagnetic.

EMBODIMENTS OF THE INVENTION

A plurality of abrasive wires (examples 1-6) have been prepared from a steel core in the hardened state. The steel core comprises 0.8% of carbon, it has a 0.12-millimeter diameter.

Operating Procedure:

The wires have been prepared by electrodeposition in a first electrolyte bath ($B_1$) comprising abrasive particles, to form an external composite coating on the steel core. The composition of each of the elements is summarized in table 1.

The abrasive particles used are diamonds (from 12 to 22 µm) coated with nickel. The nickel mass forms 56% of the total mass of the coated abrasive particles.

Example 1: Iron-Based Binder (Fe)

The treatment conditions of the steel core in bath ($B_1$) are the following:
current density: 5 A/dm$^2$
temperature: 55° C.
anodes: pure iron The iron-based coating thus obtained contains approximately 5% of oxygen. It has a hardness of approximately 400 Hv.

Example 2: Binder Based on Iron and Carbon (Fe+C)

The treatment conditions of the steel core in bath ($B_1$) are identical to those of example 1 except for the current density and the presence of citric acid and of L ascorbic acid.

Indeed, the carbon content in the binder increases with the current density. Below 0.5 A/dm$^2$, the carbon content is smaller than 0.5%, which percentage may appear to be insufficient to have an influence on the hardness of the deposit (binder).

However, when the current density is greater than 2 A/dm$^2$, the carbon content stabilizes around 1.5%.

However, in practice, the current density is advantageously smaller than 2 A/dm$^2$. Indeed, beyond 2 A/dm$^2$, the binder has an oxygen content greater than 3% by mass, which quantity embrittles the deposit (binder).

The iron-based coating at 1 A/dm$^2$ contains approximately 1% of carbon, with approximately 2% of oxygen.

The hardness of the deposit increases from 500 Hv (0.5% of carbon) to 800 Hv (1.5% of carbon).

Example 3: Binder Based on Iron and Boron (Fe+B)

The treatment conditions of the steel core in bath ($B_1$) are identical to those of example 1, also in the presence of boric acid and of borane dimethylamine.

The coating thus obtained is made of an iron and boron alloy (from 0.3 to 0.7%). It further comprises oxygen traces (<2%).

Its hardness is approximately 300 Hv.

Boron additions from 0.3 to 0.7% appear to lower the oxygen content of the iron deposit, and thus, to lower the brittleness of the electrodeposited metal.

Example 4: Binder Based on Iron, Boron, and Carbon (Fe+C+B)

The treatment conditions of the steel core in bath ($B_1$) are identical to those of example 1, also in the presence of citric acid of L ascorbic acid, of boric acid, and of borane dimethylamine.

The coating thus obtained is made of an alloy of iron, of carbon (1%), and of boron (from 0.3 to 0.7%), with oxygen traces (<2%).

Its hardness is approximately 600 Hv.

At 5 $A/dm^2$, the deposit is not brittle.

Example 5: Binder Based on Iron and Phosphorus (Fe+P)

The treatment conditions of the steel core in bath ($B_1$) are identical to those of example 1, also in the presence of sodium hypophosphite and possibly of aluminum sulfate.

The hardness is approximately 300 Hv for 1% of phosphorus.

The hardness is approximately 900 Hv for 9% of phosphorus.

The brittleness is lower when the phosphorus content is in the range from 1 to 6%.

The obtained deposits contain from 1% to 9% of phosphorus.

They contain less than 3% of oxygen.

Their corrosion is more difficult.

The addition of from 1% to 9% of phosphorus in the electrodeposited iron appears to lower its oxygen content (and thus its brittleness) and its sensitivity to corrosion.

Example 6: Binder Based on Iron, Carbon, and Phosphorus (Fe+C+P)

The treatment conditions of the steel core in bath ($B_1$) are identical to those of example 1, also in the presence of citric acid of L ascorbic acid, of sodium hypophosphite, and of aluminum sulfate.

TABLE 1

Compositions of electrolytes used in examples 1-6. The quantities are expressed in g/L.

| Examples | | 1 | 2 | 3 | 4 | 5 | 6 |
|---|---|---|---|---|---|---|---|
| Electrolyte[a] | $Fe^{2+}$ $FeSO_4$, $(NH_4)_2$ $SO_4$, $6H_2O$ | 300 | 300 | 300 | 300 | 300 | 300 |
| | $Fe^{2+}$ $FeCl_2$, $4H_2O$ | 40 | 40 | 40 | 40 | 40 | 40 |
| | sulfuric acid $H_2SO_4$ | 0.12 | 0.12 | 0.12 | 0.12 | qs[i] | qs[i] |
| | citric acid $C_6H_8O_7$ | | 1.2 | | 1.2 | | 1.2 |
| | L ascorbic acid $C_6H_8O_6$ | | 3 | | 3 | | 3 |
| | boric acid $H_3BO_3$ | | | 40 | 40 | | |
| | borane dimethyl-amine $(CH_3)_2$ $NH\ BH_3$ | | | 1.8 | 1.8 | | |
| | Sodium hypophosphite $H_2Na_2PO_2$ | | | | | 3 | 3 |
| | aluminum sulfate $Al_2(SO_4)_3$, $18H_2O$ | | | | | 5 | 5 |
| electrolyte pH | | 4.5-5 | 4.5-5 | 4.5-5 | 4.5-5 | 1-2 | 1-2 |
| Current density ($A/dm^2$) | | 5 | 1 | 5 | 5 | 5 | 5 |

[i]qs: quantity sufficient to obtain the pH of the electrolyte

TABLE 2

Properties of the binders according to examples 1-6.

| | | Examples (binder) | | | | | |
|---|---|---|---|---|---|---|---|
| | | 1 Fe | 2 Fe + C | 3 Fe + B | 4 Fe + C + B | 5 Fe + P | 6 Fe + C + P |
| Addition elements | % O | 5% | 2% | <2% | <2% | <3% | <3% |
| | % C | | 1% | | 1% | | 1% |
| | % B | | | 0.5% | 0.5% | | |
| | % P | | | | | 4% | 4% |
| Hv hardness | | 200-400 | 600 | 300 | 600 | 500 | 600 |
| Brittleness | | Average | Strong | Low | Low | Low | Low |
| Corrosion | | Strong | Strong | Strong | Strong | Low | Low |

The percentages of the addition elements are expressed with respect to the mass of the binder on the steel core of the abrasive wire.

The invention claimed is:

1. An abrasive wire comprising a steel core and a coating comprising a binder and abrasive particles, said binder being formed of at least one iron alloy layer containing, by mass with respect to the binder mass:
   from 0 to 3% of oxygen; and
   from 0.3% to 9% of at least one element selected from the group consisting of carbon, boron, and phosphorus.

2. The abrasive wire of claim 1, wherein the binder comprises two layers of iron alloy containing, by mass and independently from one layer to the other, from 0 to 3% of oxygen, and from 0.3% to 9% of at least one element selected from the group consisting of carbon, boron, and phosphorus.

3. The abrasive wire of claim 1, wherein the iron alloy comprises from 0.5 to 1.5% by mass of carbon.

4. The abrasive wire of claim 1, wherein the iron alloy comprises from 0.3 to 1% by mass of boron.

5. The abrasive wire of claim 1, wherein the iron alloy comprises from 1 to 9% by mass of phosphorus.

6. The abrasive wire of claim 1, wherein the iron alloy may comprise at least 97% by mass of iron, and less than 1% by mass of nickel, and/or less than 1% by mass of cobalt.

7. The abrasive wire of claim 1, wherein the abrasive particles are formed of grains at least partly covered with a film made of a metallic material.

8. The abrasive wire of claim 7, wherein the metallic material is ferromagnetic.

9. The abrasive wire of claim 1 wherein the at least one iron alloy layer contains, by mass with respect to the binder mass, from 0 to 2% of oxygen.

10. A method of manufacturing an abrasive wire, according to the steps of:
- electrodeposition on a steel wire of a composite coating comprising a binder and abrasive particles, by passing in an electrolyte bath (B1) comprising at least iron II ions, abrasive particles, and at least one source of at least one element selected from the group consisting of carbon, boron, and phosphorus;
- optionally, electrodeposition of an additional layer of iron alloy binder by passing in an electrolyte bath (B2) comprising at least iron II ions, and at least one source of at least one element selected from the group consisting of carbon, boron, and phosphorus
- wherein said binder is formed of at least one iron alloy layer containing, by mass with respect to the binder mass:
- from 0 to 3% of oxygen; and
- from 0.3% to 9% of at least one of the elements selected from the group consisting of carbon, boron, and phosphorus.

11. The abrasive wire manufacturing method of claim 10, wherein the baths ($B_1$) and ($B_2$) comprise, independently from each other, from 20 to 100 g/L of iron II ions.

12. A method of sawing a material selected from the group consisting of silicon, sapphire, and silicon carbide, said method comprising the steps of providing an abrasive wire and using the abrasive wire to saw the material;
- wherein the abrasive wire comprises a steel core and a coating comprising a binder and abrasive particles, said binder being formed of at least one iron alloy layer containing, by mass with respect to the binder mass:
- from 0 to 3% of oxygen; and
- from 0.3% to 9% of at least one element selected from the group consisting of carbon, boron, and phosphorus.

13. An abrasive wire comprising a steel core and a coating comprising a binder and abrasive particles,
- wherein said binder is formed of an iron alloy layer consisting of iron and, by mass with respect to the binder mass:
- from 0 to 3% of oxygen, and
- from 0.3% to 9% of phosphorous.

* * * * *